United States Patent Office 3,572,156
Patented Mar. 23, 1971

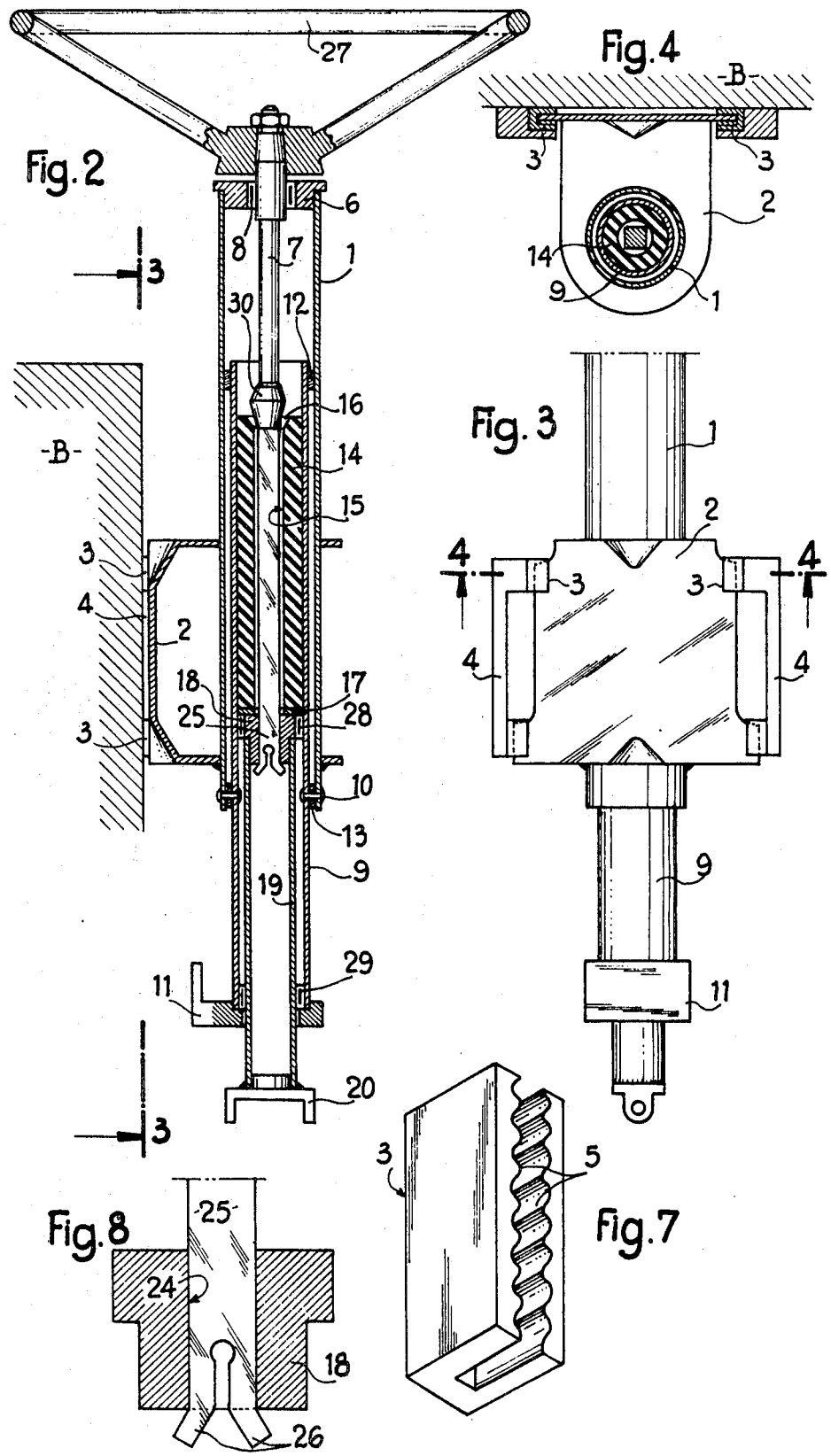

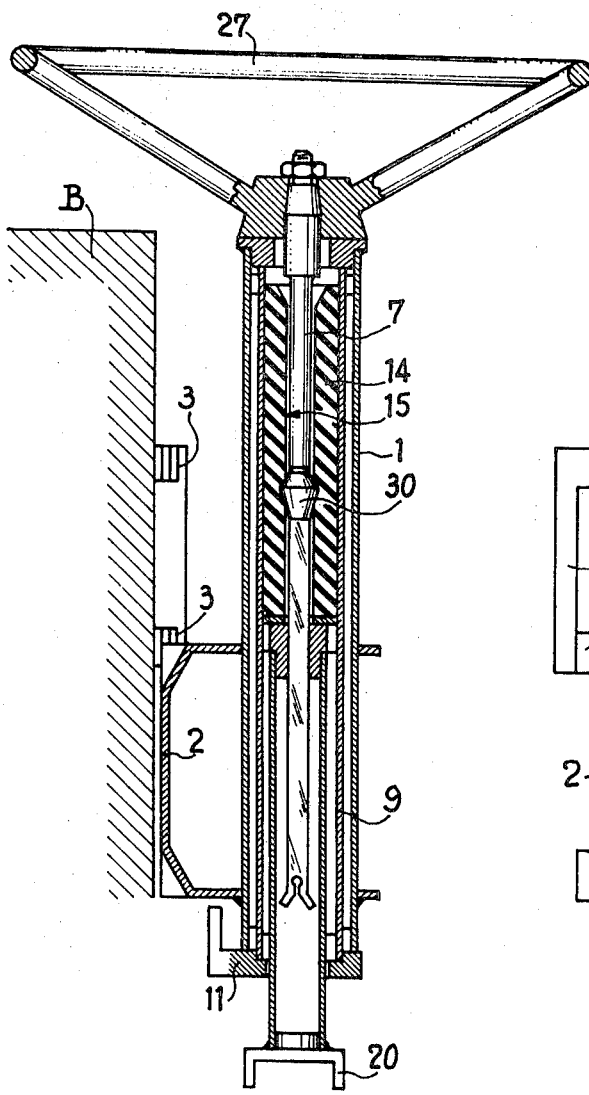
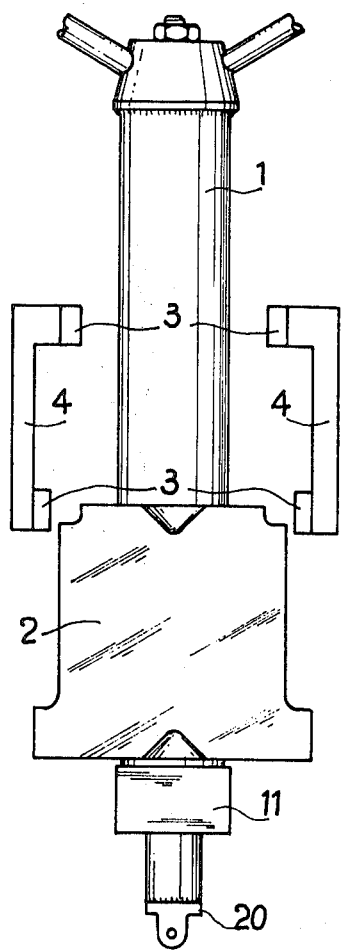

3,572,156
SAFETY STEERING COLUMN FOR AN
AUTOMOBILE VEHICLE
Michel Grançon, Marnes-la-Coquette, France, assignor to
Automobiles Peugeot, Paris, and Regie Nationale des
Usines Renault, Billancourt, France
Filed Feb. 25, 1969, Ser. No. 801,960
Claims priority, application France, Mar. 20, 1968,
144,499
Int. Cl. B62d 1/18
U.S. Cl. 74—492
10 Claims

ABSTRACT OF THE DISCLOSURE

Safety steering column structure for a vehicle. The column structure comprises a steering shaft carrying the steering wheel and slidably keyed relative to an element which bears against the body of the vehicle. The shaft is connected to rotate with the steering mechanism. A projection on the shaft is adapted to force a passage through energy absorbing and dissipating material which does not restore the energy when a thrust on the shaft results in a relative displacement between the projection and the material. The projection is in the normal steering position, located a short distance from an entrance in the material.

---

The present invention relates to an improved safety steering column for an automobile vehicle.

The invention provides a relatively simple and thoroughly reliable steering column, wherein an upper section of the steering shaft on which the steering wheel is fixed is slidably keyed relative to a lower section which is connected to rotate with the steering mechanism to be controlled and bears against the body of the vehicle, said upper section of the shaft comprising a projection adapted to force a passage in a fixed sleeve of an energy absorbing and dissipating material which does not restore this energy upon an impact which causes an axial thrust to be exerted on said steering wheel resulting in a relative displacement between said projection and said material, said projection being, in the normal steering position, located at a short distance from an entrance provided in said material.

In normal operation, the projection on the upper section of the steering shaft is outside said energy absorbing material and therefore results in no friction which could hinder the steering.

On the other hand, upon a brutal impact on the front of the vehicle causing the driver to be thrown onto the steering wheel, the steering shaft is thrust into said material and said projection must force a passage in said material and the material brakes the movement by absorbing and dissipating energy without restoring the latter.

Further features and advantages of the invention will be apparent from the ensuing description with reference to the accompanying drawings.

In the drawings:

FIG. 2 is a longitudinal sectional view of said column, on an enlarged scale;

FIG. 3 is a side elevational view on line 3—3 of FIG. 2;

FIG. 4 is a cross-sectional view taken along line 4—4 of FIG. 3;

FIG. 5 is a view identical to that of FIG. 2 after impact;

FIG. 6 is an elevational view taken along line 6—6 of FIG. 5;

FIG. 7 is a perspective view of a block for fixing the device to the vehicle;

FIG. 8 is a detail view on a scale larger than that of FIGS. 2-6, and,

Figure 1:
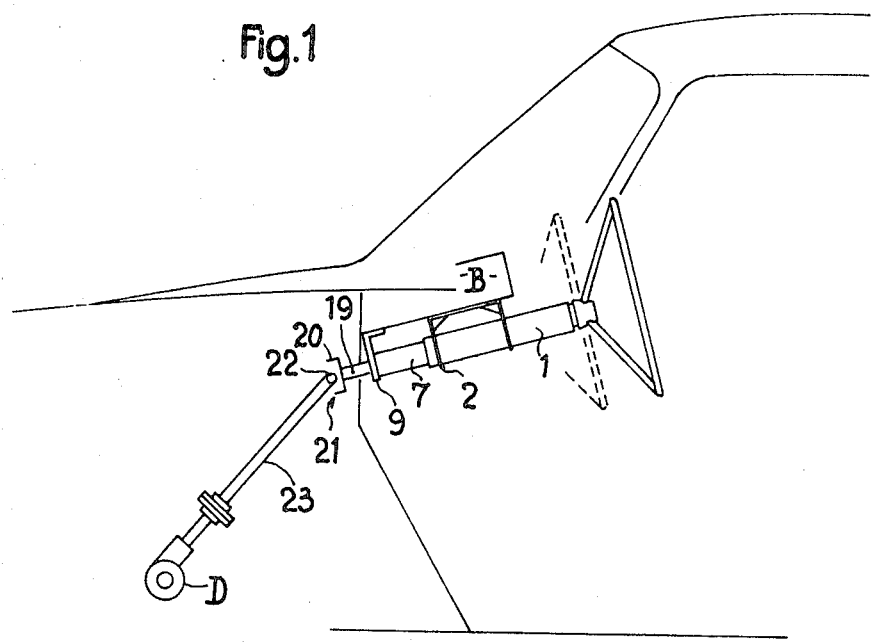
FIG. 1 is a diagrammatic elevational view of the arrangement of the safety steering column employing a universal joint according to the invention.

The invention is illustrated, and will be described, as applied to a universal joint steering column, which is a particularly unfavourable case in which the available thrust travel of the steering shaft is limited and thus creates a large force.

In this embodiment, a tubular case 1 is welded to a bracket or bridge 2 fixed to the dashboard or instrument panel B of the vehicle through blocks 3 of plastics material one of which is shown in perspective in FIG. 7. These blocks are attached by members or fittings 4 to the dashboard and one of their features is that they have a fork shape the inner faces of which are corrugated at 5 (FIG. 7) in accordance with a theoretically sinusoidal contour substantially composed of arcs of a circle. These faces are greased upon assembly.

The case 1 thus secured to the dashboard B is closed at its upper end by a welded metal member 6 acting as an upper bearing block for the upper section 7 of the steering shaft through a bushing or roller bearing 8. The case 1 is rendered integral at its lower end with a lower tube 9 through rivets 10 the shear strength of which is selected in accordance with the frictional resistance of the pads 3 so that the force required to push in the upper section of the steering shaft is, right from the start of the movement, as near as possible to the maximum force that the organism of the driver can withstand without injury.

This tube 9 bears at its lower end against a fixed structural member 11 and is centered inside the case 1 by collars 12, 13 of plastics material having a low coefficient of friction.

Disposed in the tube 9 and integral therewith is a longitudinal sleeve 14 provided with an axial bore 15 of cylindrical, downwardly convergent frustoconical or other shape terminating at its upper end in a countersink 16. Disposed at the lower end of this sleeve is a washer 17 which is of metal or plastics having a low coefficient of friction and allow rotation of a subjacent member 18 with the minimum of effort.

This member 18 is welded and brazed to a tube 19 constituting the lower section of the steering shaft, the lower end of which is welded to the upper fork 20 of a universal joint 21 (FIG. 1) whose driven part 22 is connected to the steering mechanism D by a tube 23. The member 18 has a prismatic axial aperture 24 (FIG. 8), for example of square section, in which is fitted with a predetermined force fit the lower end 25 of the section 7 having the same shape.

The predetermined force fit is considerable since it is only this fit which prevents the steering wheel from being pushed in accidentally during normal use of the steering column on the vehicle (it must in particular resist for example the thrust of the driver on the steering wheel 27 upon violent braking, or accidental blows when loading the vehicle). The end 25 of the shaft 7 is for example in the known manner in the form of two branches 26 which are spread apart after assembly as shown in FIG. 8. Their cranked shape positively precludes any accidental wrenching of the steering wheel from the tube 9 by the driver.

The steering wheel assembly can rotate relative to the tube 9 with a minimum of friction owing to the provision of bushings or roller bearings 28 and 29.

Just above the sleeve 14, the steering shaft 7 comprises a projection in the form of a bi-conical head or block 30 which is welded to this shaft. The forcing of this head through the bore 15 of the sleeve 14 creates the desired resistance which absorbs without restoring the energy due to the impact of the driver of the vehicle on the steering wheel 27 without injury to the driver. At rest, that is, in normal operation of the steering unit, the head 30 is located slightly above the entrance 16 of the bore 15 of the sleeve 14.

The opposing force or resistance created by the forcing of the block 30 through the bore 15 depends:

(a) On three fundamental geometric parameters, namely, the included angle of the lower conical face of the head 30, the included angle of the upper conical face of said head, and the tight fit characterised by the difference between the diameter of the large face common to the two cones of the head 30 and the diameter of the bore 15;

(b) On two mechanical parameters, namely the state of the surface of the two conical faces of the head 30 and the state of the surface of the bore 15;

(c) On a material parameter, namely the nature of the material of the sleeve 14.

This material can be:

An elastically yieldable material such as an elastomer, in particular a mouldable or injectable polyurethane, in which the bi-conical head 30 compresses as it travels, transversely, that is, locally, the material which is subsequently released so that the elastic reaction has an axial resultant which is nil or in any case negligible, so that, after a movement of the head 30 in the direction of travel into the sleeve 14, it is not pushed upwardly back by this sleeve.

Alternately, this material can be a malleable material such as lead which is capable of flowing by plastic deformation under the head 30 towards the top of the latter in the course of downward movements of this head.

The steering column operates in the following manner:

When, owing to any outside influence, the driver of the vehicle is thrown onto the steering wheel 27 with a high impact velocity the following phenomena occur in the stated order:

(1) The end 25 of the section 7 of the steering shaft slides into the aperture of corresponding shape of the member 18 which remains fixed in space owing to the fact that the universal joint 21 due to the general conception of the steering column and of the structure of the vehicle remains a fixed point. This sliding takes up longitudinal clearances at the upper end of the steering column between the steering wheel 27 and the member 6 welded to the case 1.

(2) Upon contact of the steering wheel 27 with this member 6 a large part of the impact force passes into the case 1 which in part transmits it to the blocks 3 and in part through the rivets 10 and the tube 9 to the member 11 which also constitutes a fixed point. Consequently, the rivets 10 shear and the bracket 2 starts to slide in the blocks 3, this movement occurring with no danger of wedging and therefore with minimum risk of bending of the case 1 owing to the provision of the bushings 12 and 13.

(3) Very rapidly, the clearance between the head 30 and the entrance countersink 16 of the bore 15 of the sleeve 14 is taken up. At this moment the head 30 is forced into the bore 15 and either the radial elastic deformation of the polyurethane, or the flow of the lead, creates a desired opposing force which absorbs the energy of impact of the driver at a rate which is substantially constant or varies as a function of the driving in of the head 30. This depends merely on the longitudinal profile of the bore 15 (cylindrical, conical, with successive decreases and increases in the diameter in accordance with a chosen pitch, the latter case requiring, for mass-production, the construction of the sleeve 14 in the form of a stack of washers each of which is bored in accordance with a roughly conical profile in the most complicated contemplated embodiment).

At the end of the operation of the device according to the invention, the position shown in FIGS. 5 and 6 is reached.

Figure 9:
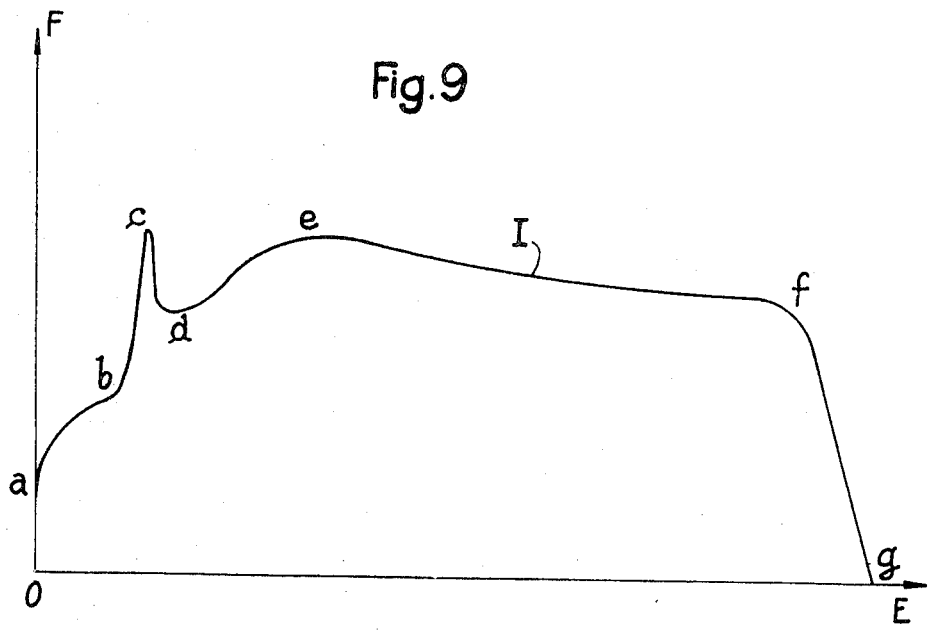
FIG. 9 is a graph showing, as ordinates, the forces opposing the movements of the steering shaft which are plotted as abscissae.

The curve I in the graph of FIG. 9 resumes the operation of a steering column according to the invention. This curve gives the values of the opposing forces F, namely the forces opposed by the device as a function of the distance E to which the shaft 7 is driven into the sleeve 14. The origin O corresponds to start of the impact. The ordinate $Oa$ corresponds to the force maintained in the steering wheel under normal conditions of utilization.

The arc $ab$ corresponds to the sliding of the part 19 of the shaft 7 in the member 18.

The straight line $bc$ corresponds to the shearing of the rivets 10.

The curve $de$ corresponds to the superposition of the decreasing force due to the friction of the bracket 2 in the blocks 3 and the increasing force due to the travel of the head 30 in the bore 15 of the sleeve 14.

The curve $ef$ corresponds to the roughly constant force of the penetration of head 30 in the bore 15 of the sleeve 14.

The point $g$ corresponds to the end of the impact.

Although a specific embodiment of the invention has been described, many modifications and changes may be made therein without departing from the scope of the invention as defined in the appended claims.

Having now described my invention what I claim and desire to secure by Letters Patent is:

1. A safety steering column structure for an automobile vehicle having a body and a steering mechanism, said column structure comprising: a steering wheel; a steering shaft having an upper section carrying the steering wheel and a lower tubular section connected to the steering mechanism of the vehicle; means for connecting said two sections in fixed rotative relationship and in axially telescoping relationship; means for preventing the withdrawal of said upper section out of said tubular lower section; a lower tube fixed with respect to the vehicle body, coaxial with and surrounding a portion of said steering shaft; bearing means in said lower tube for rotatably supporting said lower section of the steering shaft; a sleeve of deformable material lining the inner periphery of said lower tube and located around a portion of said upper section of the steering shaft, said sleeve having an axial bore the diameter of which is greater than the transversal dimension of said portion of the steering shaft; a projection provided on a portion of said upper section of the steering shaft which is located out of and adjacent said sleeve, said projection having a substantially biconical shape and being larger in transversal cross-section than said axial bore in said sleeve; an upper tubular case extending partially around said lower tube and around the upper portion of the steering shaft, bearing means at the upper end of said tubular case for rotatably supporting said upper section of the steering shaft; and means for frictionally and slidably mounting said upper tubular case on the vehicle body whereby said tubular case can be moved, together with said upper section of the steering shaft and slide along said lower tube, upon sufficient axial thrust exerted on said steering wheel.

2. A safety steering column structure as claimed in claim 1, wherein said material is an elastically yieldable material, said projection being roughly symmetrical relative to a plane transverse to the steering whereby it compresses said material transversely and locally as it passes through said material which is thereafter released so that the elastic reaction has a negligible axial resultant.

3. A safety steering column structure as claimed in claim 2, wherein said material is an elastomer.

4. A safety steering column structure as claimed in claim 1, wherein said material is a malleable material capable of flowing from below the projection towards the upper part of the latter in the course of downward movement of the projection.

5. A safety steering column structure as claimed in claim 4, wherein said material is lead.

6. A safety steering column structure as claimed in claim 1, wherein said bore of said sleeve defines at its upper end an enlarged entrance for said projection.

7. A safety steering column structure as claimed in claim 6, wherein said upper tubular case is fixed to said lower tube by shearable rivets.

8. A safety steering column structure as claimed in claimed in claim 1, comprising blocks fixed to the body of the vehicle and a bracket fixed to said case and frictionally slidably mounted in said blocks.

9. A safety steering column structure as claimed in claim 8, wherein the blocks have a U-section, the branches of the U-section having corrugations gripping the edges of the bracket.

10. A safety steering column structure as claimed in claim 1, wherein said upper section of the steering shaft has a polygonal cross-section in its portion located below said projection, said means for connecting said two sections comprising a connecting member provided with a corresponding polygonal shaped aperture being fixed at the upper end of the lower tubular section of the steering shaft for receiving the lower part of said upper section of the steering shaft, a washer of a material with a low friction coefficient being provided between the lower face of said sleeve and said member.

References Cited
UNITED STATES PATENTS

| | | | |
|---|---|---|---|
| 3,459,063 | 8/1969 | Numazawa | 74—492 |
| 3,461,740 | 8/1969 | Tajima et al. | 74—492 |

MILTON KAUFMAN, Primary Examiner